United States Patent Office.

GEORGE W. ADLER, OF PHILADELPHIA, PENNSYLVANIA, ASSIGNOR TO HIMSELF AND GEORGE BOCHIUS, OF SAME PLACE.

Letters Patent No. 99,387, dated February 1, 1870.

IMPROVED COMPOUND FOR BATING AND RAISING HIDES.

The Schedule referred to in these Letters Patent and making part of the same.

*To all whom it may concern:*

Be it known that I, GEORGE W. ADLER, of Philadelphia, Pennsylvania, have invented a new and useful " Improvement in Compounds for Treating Hides and Skins;" and I do hereby declare that the following is a full, clear, and exact description of the ingredients, and proportions used in preparing the same.

The object of my invention is to prepare a compound for depilating and raising hides and skins preparatory to tanning the same, and thus dispense with milling and breaking.

To accomplish this, I use a compound, consisting of gas-lime, that is, lime charged with sulphuretted hydrogen gas, which is the refuse lime of gas-works, an alkali, such as soda, potash, pearlash, or soda-ash, pure lime and an oil. I thus produce a compound which acts as a preservation, as well as a depilating and raising agent.

To enable those skilled in the art to make and use my compound, I will now proceed to describe its proportions.

Take of lime, pure unslaked or slaked, two bushels; take of soda-ash, or any other alkali, fifty pounds; take of oil, either vegetable, fish, animal, or mineral, two and one-half gallons; and take of gas-lime, or lime charged with sulphuretted hydrogen gas, two bushels, or enough to make a solution of required strength as a depilatory.

In mixing or forming the compound, I take the gas-lime and add sufficient water to make a solution. I then take the two bushels of lime and slack, after which I add the fifty pounds of soda-ash, or other alkali, and dissolve it in water, or add it, the soda-ash or other alkali, direct to the solution. I now add the two and one-half gallons of oil, and mix the whole together, so that they will be thoroughly incorporated.

The compound is then ready for use, and is applied according to judgment, all of which is well known to those skilled in the art of tanning or treating hides and skins.

When the gas-lime is added to water, sufficient to make a solution, I have the most powerful depilatory known, but this is of no use, except as a depilatory, until I add the soda or alkali, as a raising agent, for the purpose of swelling the hides or skins; the oil forms a basic or mineral soap in connection with the soda and lime, and prevents the destructive action of the alkali, upon the gelatine and tissues or fibres of the hides or skins.

It will be seen from the above description, that I do not limit myself to any particular alkali or oil used, as most any of these articles will produce the same result, neither do I wish to limit myself to the exact proportions set forth, as more or less of each article used may answer the same purpose, although the formula herein given has produced the best results in practice.

Having thus described my invention,

I claim, and desire to secure by Letters Patent of the United States, is—

A compound for treating hides and skins, composed of the ingredients herein set forth, in or about the proportions specified.

In testimony whereof, I have hereunto signed my name in the presence of two subscribing witnesses.

GEO. W. ADLER.

Witnesses:
CHARLES H. EVANS,
GEO. E. NICHOLS.